United States Patent [19]

Kuwabara

[11] Patent Number: 4,861,166

[45] Date of Patent: Aug. 29, 1989

[54] METHOD FOR REMOVING BUBBLES FROM CONTAINER MADE OF SYNTHETIC RESIN FILLED WITH SOLUTION AND DEVICE THEREOF

[75] Inventor: Chihiro Kuwabara, Kamisato, Japan

[73] Assignee: Eisai Co., Ltd., Japan

[21] Appl. No.: 149,667

[22] Filed: Jan. 28, 1988

[30] Foreign Application Priority Data

Feb. 5, 1987 [JP] Japan ................................ 62-26075

[51] Int. Cl.[4] ........................ B01F 9/02; B65G 15/14; B65G 47/24

[52] U.S. Cl. .................................... 366/219; 198/405; 198/623; 198/626

[58] Field of Search ........................ 366/208, 218, 219; 198/402, 405, 623, 626, 814; 55/36, 52, 159, 190; 356/240, 427

[56] References Cited

U.S. PATENT DOCUMENTS

| | | | |
|---|---|---|---|
| 2,759,594 | 8/1956 | Kleboe et al. | 198/814 |
| 3,218,463 | 11/1965 | Calhoun | 356/240 X |
| 3,729,189 | 4/1973 | Watson | 198/405 X |
| 3,767,028 | 10/1973 | Rosso | 198/405 |
| 3,961,705 | 6/1976 | Suciu | 198/402 |
| 4,095,904 | 6/1978 | Klein et al. | 356/427 |
| 4,136,930 | 1/1979 | Gomm et al. | 356/240 X |
| 4,209,802 | 6/1980 | Fogg et al. | 356/240 X |
| 4,680,463 | 7/1987 | Lutgendorf et al. | 356/240 X |
| 4,705,157 | 11/1987 | Bowles | 198/405 |

FOREIGN PATENT DOCUMENTS

| | | | |
|---|---|---|---|
| 773844 | 5/1957 | United Kingdom | 366/218 |

*Primary Examiner*—Philip R. Coe
*Assistant Examiner*—Scott J. Haugland
*Attorney, Agent, or Firm*—Griffin, Branigan & Butler

[57] ABSTRACT

A method for removing bubbles from a container made of synthetic resin filled with solution comprises adding movement of inclination or reverse to the container made of synthetic resin filled with solution gradually so as to contact the surface of solution with whole round of the inner-wall of the container without any shock from outside, and changing the condition of the container so as to discharge bubbles attaching to the inner-wall of the container to outside of the solution and to remove bubbles in the container completely.

12 Claims, 8 Drawing Sheets

FIG. I

METHOD FOR REMOVING BUBBLES FROM CONTAINER MADE OF SYNTHETIC RESIN FILLED WITH SOLUTION AND DEVICE THEREOF

BACKGROUND OF THE INVENTION

The present invention relates to a method for removing bubbles which are attached on an inner-wall of a container made of synthetic resin and filled with a transparent or semitransparent solution, which bubbles create difficulties in inspecting the solution for extraneous substance in the container and a device thereof.

A container, such as an ampule for injection, or a glass bottle for transfusion filled with a solution for injection may contain extraneous substances such as glass chips, glanular substances, fibers or the like and the existence of these extraneous substances is a problem for quality control. Accordingly, all containers filled with a solution for injection must receive an inspection so as to pick up goods contaminated with extraneous substances.

In Japanese Pat. No. 1,123,819, Japanese Pat. No. 1,123,830 and Japanese Patent Laid-open SHO 57(1982)-142,252, there is disclosed an optical automatic inspection device for inspecting for the existence of extraneous substances contained in the container, by means of the following steps, i.e.; after rotating a container such as an ampule for injection or a bottle for transfusion solution, at high velocity, rapidly stopping the rotary movement thereof, projecting a ray of light on the solution for injection in the container, receiving the ray of light passing through the solution in the container by means of a light sensor and in case that the amount of the received light is less than a given amount, it is judged that extraneous substances exist in the container.

However, in case of a container made of synthetic resin filled with a solution, since there often exist bubbles on a surface of an inner-wall of the container it is probable that the well-known optical automatic inspecting device indicates a positive reaction by judging bubbles as an extraneous substance.

In the container filled with solution, there exist not only the solution but also a gaseous body such as air and/or nitrogen, etc, and the volume of the container is determined by both volumes of the solution and the gaseous body. In comparison with a glass bottle, in a container made of synthetic resin, a number of small gaseous bubbles are easily generated by vibration which the container received at the time of pouring the solution into the bottle or during transportation of the container, as well as further rotary movement of the container in the step of inspection of extraneous substances, or during changes in temperature which the container received in various kinds of processing environments. The generated gaseous bubbles attach upon the inner-wall of the container and it is hard to remove the bubbles entirely from the inner-wall of the container even by leaving the container at rest for a long time or by vibration, shock or the like.

When adding rotary movement at high velocity to the container in the same manner as the conventional optical automatic inspecting device, the gas existing in the upper portion of the container is incorporated in the solution to produce many gaseous bubbles in the container. On the other hard, when adding rotary movement at low velocity, the bubbles so attach to the inner-wall of the container that they cannot be removed at all.

Accordingly, when the inspection for extraneous substance is conducted on the container having many small gaseous bubbles on the inner-wall thereof, the bubbles generated by rotation float in the solution in the container and are received by the light sensor as same as extraneous substances. It is therefore provable that the container having no extraneous substances is also judged as a container having extraneous substances.

SUMMARY OF THE INVENTION

It is an object of the present invention to provide a method which is extremely simple and economical in construction for effectively removing bubbles attached to an inner-wall of such a synthetic resin container which method does not produce of synthetic resin any shock which is one cause of generation of new bubbles in the container and to provide a device thereof.

According to the present invention, the aforementioned object is attained by means of a method for removing bubbles from a container made of synthetic resin filled with a solution, which comprises causing a movement of inclination and/or reverse positioning to the container made of synthetic resin and filled with solution so as to contact the upper surface of the solution with the entire inner-wall of the container at a relatively low velocity and without any shock from outside the container and changing the position of the container so as to discharge bubbles attached to the inner-wall of the container to outside of the solution, i.e. to the head space of the container and to remove bubbles in the container completely from the solution and the inside walls of the container wetted thereby.

In case of performing the aforesaid method for removing bubbles, there is used a device for removing bubbles from a container made of synthetic resin filled with solution, which comprises a pair of right and left vertical rolls and a pair of upward and downward horizontal rolls interdisposed therebetween and belts provided between said pair of right and left vertical rolls and said pair of upward and downward horizontal rolls adjoining each other, wherein the vertical roll on one side is linked with the horizontal roll on one side by at least one belt and the vertical roll on the other side is linked with the horizontal rolls on the other side by at least one other belt, and the at least two belts cross each other so as to cause the movement of inclination and/or reverse positioning of the container.

The bubbles in the container are entirely removed by the method according to the present invention. Since the inclination and reverse of the container are performed by the rolls and the belts, the device can be produced at a low cost. The rolls and the belts move smoothly, so there is no shock from the outside of the container. Where it is hard to remove bubbles because of the coefficient of viscosity of the solution or the kind thereof, the removal of these difficult bubbles can be attained by adding to the movement of inclination or reverse positioning a rotary movement of the container and which rotary movement can be performed by changing the velocity of rotation of the opposite rolls and then changing the velocity of movement of one belt contacting with one side of the container from that of the other belt contacting with the other side of the container.

Further, the device according to the present invention can be applied to any container made of synthetic resin such as a round type bottle and other container having special shape.

BRIEF DESCRIPTION OF THE DRAWINGS

In the drawings:

FIG. 3(*b*) is a view explaining conditions of rotary movement of the container in each step of FIG. 3(*a*);

DETAILED DESCRIPTION OF THE INVENTION

In FIGS. 1 to 5, there is shown one embodiment of a device for removing bubbles from a container made of synthetic resin filled with solution according to the present invention.

Hereinafter, the embodiment will be explained based on FIG. 1 and FIG. 2. A conveyor 1 belt comprises one part in which steps from A to F are performed and another part in which step G is performed, and turn tables 2, 3, 4 are provided on parts where the moving direction of a container is changed.

Figure 8:
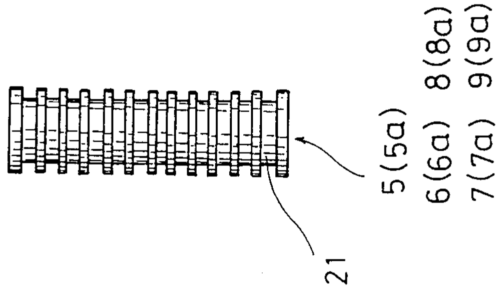
FIG. 8 is a front view of a vertical roll and a horizontal roll.

In steps from B to E, there are provided series of a pair of right and left vertical rolls (5, 5*a*), (6, 6*a*) and (7, 7*a*), and series of a pair of upward and downward horizontal rolls (8, 8*a*) and (9, 9*a*) arranged between each pair of the vertical rolls. The shapes of the vertical roll and the horizontal roll are shown from FIG. 8.

The inclination or the reverse position is achieved with the container by steps A, B, C, D, E, F and G as described as follows.

In Step A, a container is conveyed continuously from a sterilizing step and supplied to the device for removing bubbles. At this point, many small gas bubbles are attached to an inner-wall of a polyethylene container.

Figure 2:
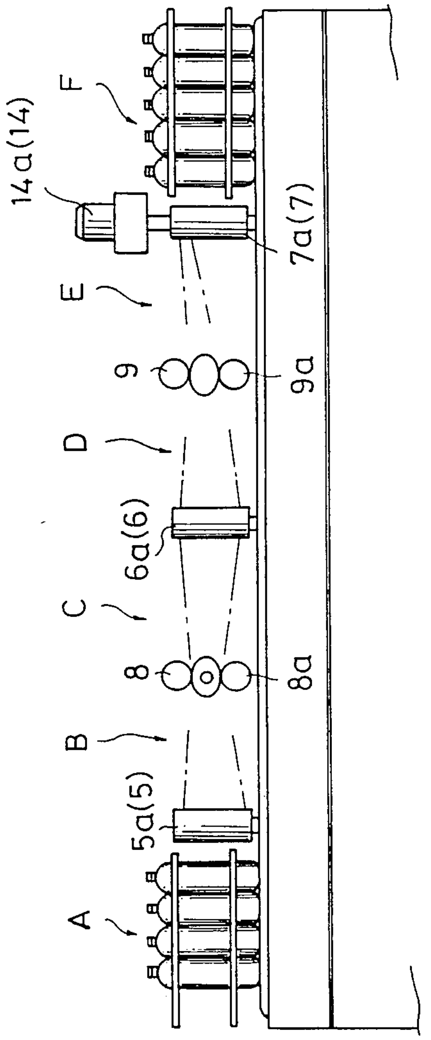
FIG. 2 is a front view of FIG. 1.
Figure 4:
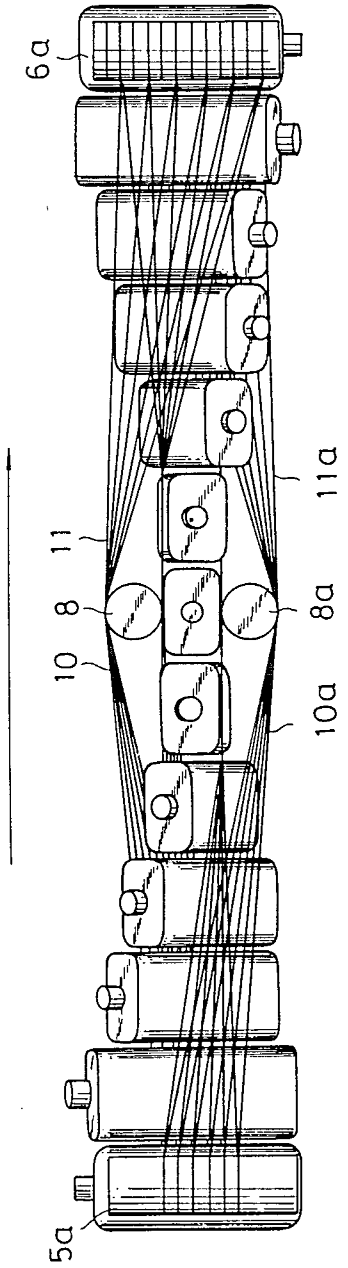
FIGS. 4 and 5 are views explaining conditions of the container moving on round belts.

In step B, a movement of inclination is caused with the container conveyed being from Step A, in upward condition, so as to turn the container right-sideways (see FIG. 2 at 8 and 8*a* and FIG. 4).

In step C, further rotary movement is caused with the container being conveyed from step B in the right-sideways position so as to turn the container downwardly (see FIG. 4).

Figure 5:
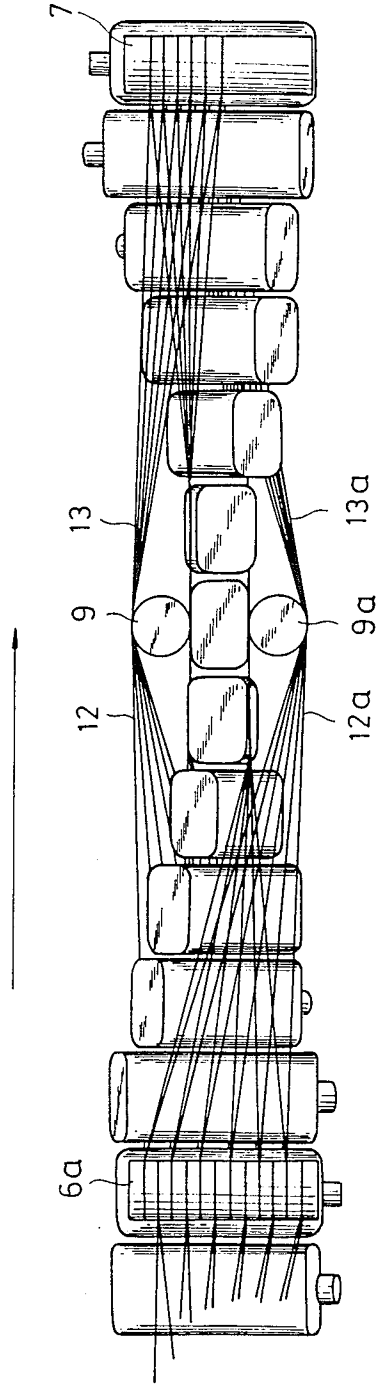

In step D, a movement of inclination is gradually caused with the container being conveyed from step C, in downward, position so as to turn the container left-sideways (see FIG. 5).

In Step E, further rotary movement is caused with the container being conveyed from step D, in left-sideways position so as to turn the container upwardly to the same position of step (A) (see FIG. 5).

Figure 1:
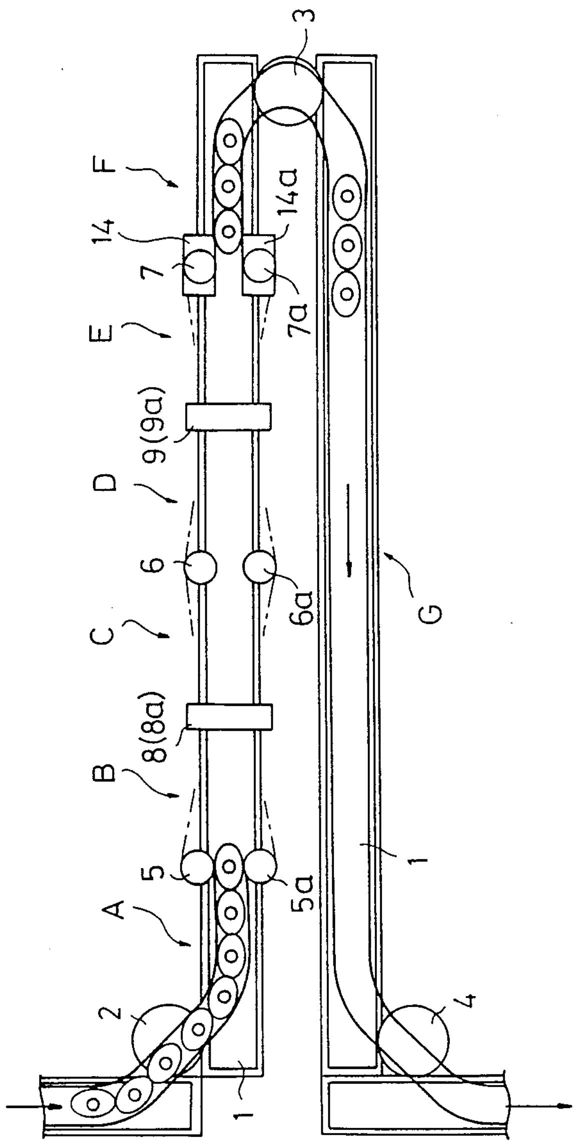
FIG. 1 is a plan view showing a device having steps from A to G.

In step F, the container, in an upward position, is sent to the next step (see FIG. 1).

In step G, the conveying time of the container is adjusted (for resting purposes) and the container is sent to a next step, e.g., an inspection step.

Figure 3B:
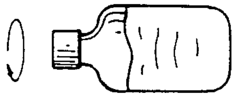
FIG. 3(*a*) is a view explaining conditions of a container from step B to step E.
Figure 3A:
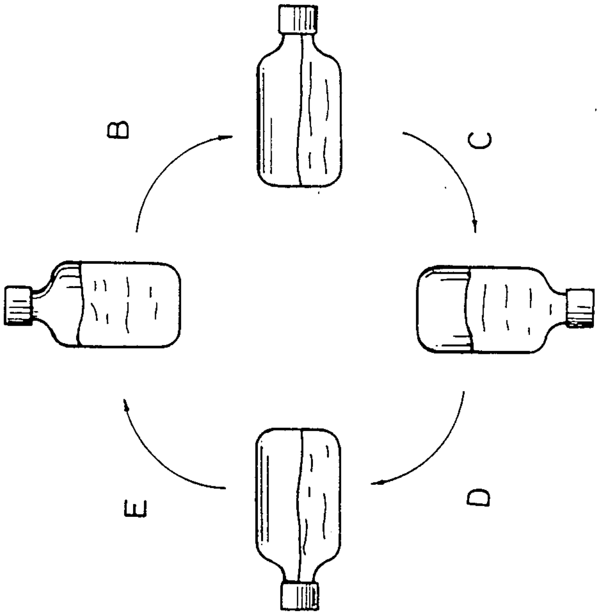

In FIG. 3(*a*), there is described the change of positions of the container as described above.

That is, in step B the container is gradually inclined to turn right-sideways: in step C the position of the container is gradually changed from right-side position to downward position; in step D the position of the container is gradually changed from the downward position to the left-sideways position. In step E the position of the container is gradually changed from the left-sideways position to the upward position.

As for steps from B to E, a specific device is described in FIGS. 4 and 5. FIG. 4 shows steps from B to C, and FIG. 5 shows steps from D to E.

Firstly, step B is performed between vertical rolls 5, 5*a* and horizontal rolls 8, 8*a*. Endless round belts 10 are linked between vertical roll 5 and the horizontal roll 8, respectively, and endless round belts 10*a* are also linked between the vertical roll 5*a*, provided on left side of the vertical roll 5, and the horizontal roll 8*a*, provided below the horizontal roll 8, respectively, and further each group of belts is crossed with respect to each other. The container is held by the inside belts of the round belts 10, 10*a* linked between the vertical rolls 5, 5*a* and horizontal rolls 8, 8*a*, and which container is gradually moved and inclined to right direction (see FIG. 4).

Secondly, step C is performed between the vertical rolls 8, 8*a* and the horizontal rolls 6, 6*a*. Endless round belts 11 are linked between the vertical roll 6*a* and the horizontal roll 8, respectively, and endless round belts 11*a* are also linked between the vertical roll 6, provided on right side of the vertical roll 6*a*, and the horizontal roll 8*a*, respectively. The container is held by the inside belts of the round belts 11, 11*a* linked between the vertical rolls 6, 6*a* and the horizontal roll 8, 8*a* and which container is gradually moved and turned downwardly (see FIG. 4).

Thirdly, step D is performed between the vertical rolls 6, 6*a* and the horizontal rolls 9, 9*a*. Endless round belts 12 are linked between the vertical roll 6 and the horizontal roll 9, respectively, and endless round belts 12*a* are also linked between the vertical roll 6*a* and the horizontal roll 9*a* provided below the horizontal roll 9, respectively. The container is held by the inside belts of the round belts 12, 12*a* linked between the vertical rolls 6, 6*a* and the horizontal rolls 9, 9*a* and which container is gradually moved and turned left-sideways (see FIG. 5).

Further, step E is performed between the vertical rolls 7, 7*a* and the horizontal rolls 9, 9*a*. Endless round belts 13 are linked between the vertical roll 7 and the horizontal roll 9*a*, respectively, and endless round belts 13*a* are also linked between the vertical roll 7*a* and the horizontal roll 9. The container is held by the belts 13, 13*a* linked between the vertical roll 7, 7*a* and horizontal roll 9, 9*a* and which container is gradually moved and turned upwardly (see FIG. 5).

Motors 14, 14*a* are provided on the vertical rolls 7, 7*a* as described in FIGS. 1, 2, and the drive shafts of the motors 14, 14*a* are connected to the vertical rolls 7, 7*a*. With rotary movement in the arrow direction to the vertical roll 7, as described in FIG. 7, the rotary movement is conducted to the round belt 13*a* the round belt 12*a*, the round belt 11, and the round belt 10.

Figure 6:
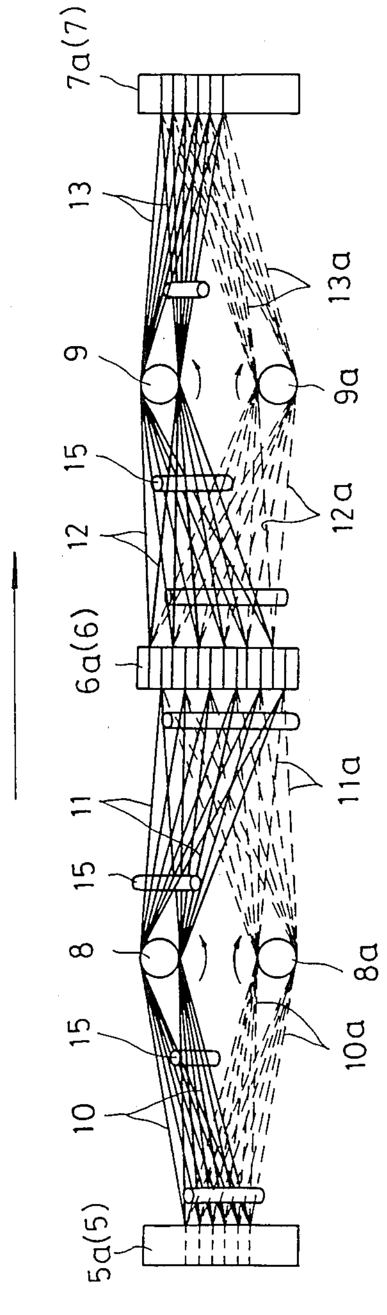
FIGS. 6 and 7 are a plane view and a front view showing the side in which rolls 15 are put to the round belts.
Figure 7:
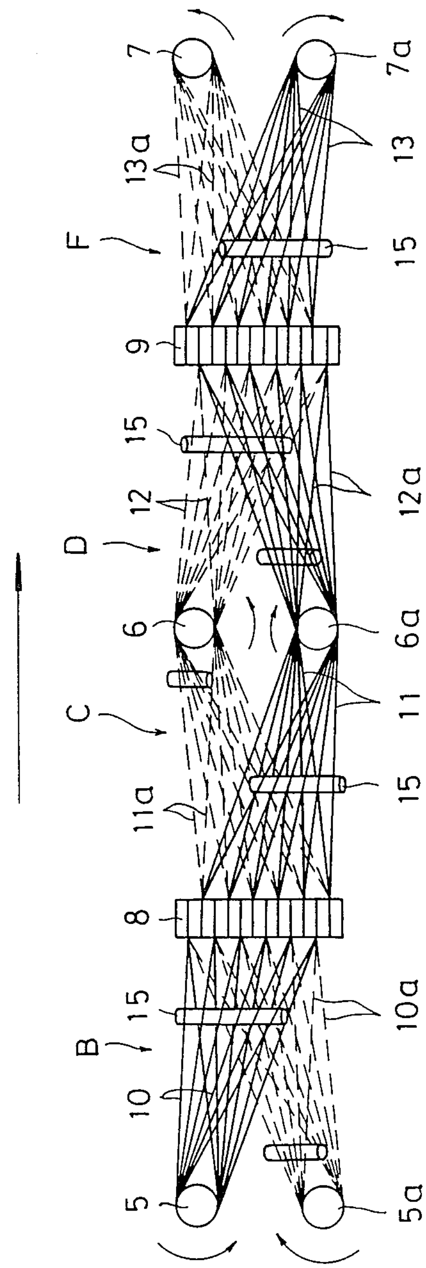

On the other hand, with rotary movement to in the arrow direction to the vertical roll 7*a*, as described in FIG. 7, the rotary movement thereof is conducted to the round belt 13, the round belt 12, the round belt 11*a*, and the round belt 10*a*. The vertical rolls 5, 5*a* and the vertical rolls 6, 6*a* rotate to the arrow direction in FIG. 7 and the horizontal rolls 8, 8*a* and horizontal rolls 9, 9*a* rotate in the arrow direction shown in FIG. 6.

In steps B to F, the belt conveyer 1 does not convey any container.

Figure 9:
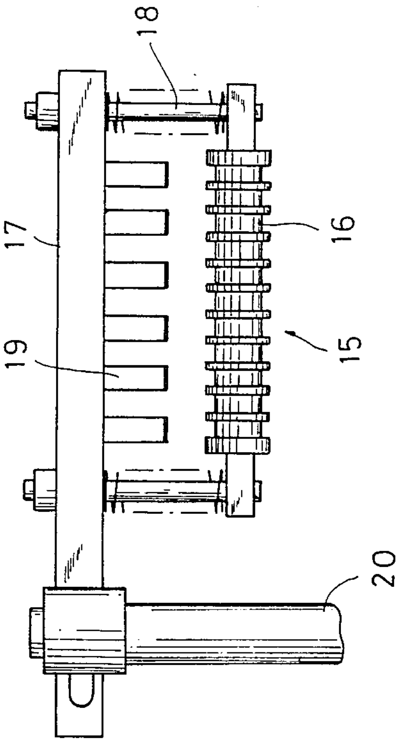
FIG. 9 is a front view showing one embodiment of the roll 15.

In FIG. 6 and FIG. 7, there is disclosed another embodiment, in which a roll 15 for adding tension to the round belts is arranged between the round belts 10, 10*a*, respectively. An embodiment of the roll 15 is shown from FIG. 9. The roll 15 has a plurality of grooves for holding the round belts. The round belt in contact with the container is put into an outside groove. A bar 17 is disposed horizontally on left side of the upper portion of a pillar 20 and the roll 15 is hung from the bar 17 by means of a pair of right and left stays 18 are. The stays 18 provided with springs so as to incline the roll 15 to a certain degree. The bar 17 itself is free to change the angle of inclination thereof.

Between each vertical roll 18, the round belts not in contact with the container are inserted so as to prevent the round belts from touching each other.

In the present invention, there is provided a passage for conveying the container held by the round belts linked between a pair of right and left vertical rolls, between a pair of upward and downward horizontal rolls and between the horizontal roll and the vertical roll.

In the embodiment shown in FIG. 4 and FIG. 5, the container is turned 360 degrees with conveying; however, by means of changing the combination of the round belts linked between the vertical rolls and the horizontal rolls, the present invention can be applied to many kinds of application; for example, the conveyance with inclining the container only to the right and left directions, the conveyance with rotating the container 180 degrees then putting it back to the original position, and the conveyance with rotating the container a desired times. With the above-mentioned steps, bubbles in the container filled with solution are substantially removed. When it is hard to remove bubbles because of the coefficient of viscosity of the solution or a kind thereof, the removal of these difficult bubbles can be attained by adding the movement of inclination or reverse positioning a rotary movement of the container which rotary movement is performed by changing the velocity of rotation of the vertical roll compared with the horizontal roll and then changing the velocity of movement of one round belt contacting with one side of the container from that of the other round belt contacting with the other side of the container.

FIG. 3(*b*) shows a condition of the rotation of the container itself from step B to step E.

The upper surface of the solution can be contacted with the entire round portion of the inner-wall of the container, e.g., a bottle by moving the container according to the present invention and therefore the bubbles attached to the inner-wall of the container can be discharged to the outside of the solution, i.e. the head space of the container and the bubbles are completely removed from the solution and inside walls of the container wetted thereby by inclination or reverse positioning of the container. Further the movement of inclination or reverse positioning of the container can be smoothly performed without any shock and the device itself is economical in construction and therefore the aforementioned disadvantage can be dispelled.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method for removing bubbles from the entire inner walls of a container made of a synthetic resin and filled with a liquid, comprising:

(1) gripping and moving a container between a plurality of endless belts engaged between a first pair of vertical rolls, a second pair of vertical rolls and a first pair of horizontal rolls disposed between said first and second pairs of vertical rolls, (2) causing a gradual inclination of the container between said first pair of vertical rolls and said first pair of horizontal rolls, such that the container is oriented in a generally horizontal direction, (3) causing a further gradual inclination of the container between said first pair of horizontal rolls and said second pair of vertical rolls, such that the container is oriented in a generally vertical and reversed orientations, and wherein the upper surface of the liquid is caused to gradually contact the entire inner walls of the container and move bubbles attached to the inner walls of the container to outside of the liquid, and wherein said movement of the container is in the absence of shock to the container.

2. A method for removing bubbles according to claim 1 further including a step for causing rotary movement of said container while said container is inclined or reversed.

3. A device for removing bubbles from the entire inner walls of a container made of synthetic resin and filled with a liquid, comprising:

(1) a first pair of vertical rolls having a first right hand roll and first left hand roll;

(2) a second pair of vertical rolls having a second right hand roll and a second left hand roll;

(3) a first pair of horizontal rolls having an upper roll and a lower roll and said pair of horizontal rolls being disposed between said first and second pairs of vertical rolls and said upper and lower rolls being spaced apart sufficiently that a said container may pass therebetween;

(4) a plurality of endless belts comprising at least one first belt, at least one second belt, at least one third belt, and at least one fourth belt wherein:

(a) said at least one first belt is engaged by said first right hand roll and the said lower roll and said at least one second belt is engaged by said first left hand roll and said upper roll, so that the container is moved in a clockwise direction between said first pair of vertical rolls and said pair of horizontal rolls, or (b) said at least one first belt is engaged by said first right hand roll and the said upper roll and said at least one second belt is engaged by said first left hand roll and said lower roll, so that the container is moved in a counter-clockwise direction between said first pair of vertical rolls and said pair of horizontal rolls, and (c) said at least one third belt is engaged by said upper roll and said second right hand roll and said at least one fourth belt is engaged by said lower roll and said second left hand roll, so that the container is moved in the clockwise direction between said pair of horizontal rolls and said second pair of vertical rolls, or (d) said at least one third belt is engaged by said upper roll and said second left hand roll and said at least one fourth belt is engaged by said lower roll and said second right hand roll, so that the container is moved in a counter-clockwise direction between said pair of horizontal rolls and said second pair of vertical rolls, and wherein a said container is engagable and movable between said first belt and said second belt so that said container is inclined during movement between said first pair of vertical rolls and said first pair of horizontal rolls and wherein said container is engageable and movable between said third belt and said fourth belt so that said container is reversed in vertical orientation during movement between said first pair of horizontal rolls and said second pair of vertical rolls.

4. A device for removing bubbles according to claim 3 further including means for rotating the container by causing a different velocity of rotation of one of said right hand rolls and one of said left hand rolls of one of said pairs of rolls which correspondingly changes the relative velocity of the belts engaging the container.

5. A device for removing bubbles according to claim 4, further including roller means disposed between said belts for adjusting the tension of said belts.

6. The device according to claim 3 wherein there are a third pair of vertical rolls and a second pair of horizontal rolls disposed between said third pair of vertical rolls and said second pair of vertical rolls, and a plurality of endless belts engage said second pair of vertical rolls, said second pair of horizontal rolls and said third pair of vertical rolls so that said container is reversed in vertical orientation during movement between said second pair of vertical rolls and said third pair of vertical rolls such that the container is restored to an upright vertical orientation.

7. A device for removing bubbles according to claim 6, further including means for rotating the container during movement between the said second and third pairs of vertical rolls.

8. A device for removing bubbles according to claim 7, further including roller means disposed between said belts for adjusting the tension of said belts.

9. A device for removing bubbles according to claim 6, further including roller means disposed between said belts for adjusting the tension of said belts.

10. A device for removing bubbles according to claim 3, further including roller means disposed between said belts for adjusting the tension of said belts.

11. A method according to claim 1 wherein the container is caused to rotate between at least one of the said first pair of vertical rolls and the said first pair of horizontal rolls and the first pair of horizontal rolls and the second pair of vertical rolls.

12. A method according to claim 1 wherein the container is caused to be reversed in vertical orientation between said second pair of vertical rolls and a further third pair of vertical rolls.

* * * * *